US012073347B2

(12) United States Patent
Miller et al.

(10) Patent No.: US 12,073,347 B2
(45) Date of Patent: *Aug. 27, 2024

(54) USER OBJECTIVE ASSISTANCE TECHNOLOGIES

(71) Applicant: MICROSOFT TECHNOLOGY LICENSING, LLC, Redmond, WA (US)

(72) Inventors: Adi L. Miller, Tel Aviv (IL); Ido Cohn, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,224

(22) Filed: May 17, 2022

(65) Prior Publication Data

US 2022/0277248 A1 Sep. 1, 2022

Related U.S. Application Data

(63) Continuation of application No. 15/464,154, filed on Mar. 20, 2017, now Pat. No. 11,361,266.

(51) Int. Cl.
*G06Q 10/0631* (2023.01)
*G06Q 10/109* (2023.01)

(52) U.S. Cl.
CPC ........... *G06Q 10/06316* (2013.01); *G06Q 10/063114* (2013.01); *G06Q 10/109* (2013.01)

(58) Field of Classification Search
CPC ..... G06Q 10/06316; G06Q 10/063114; G06Q 10/109
See application file for complete search history.

(56) References Cited

U.S. PATENT DOCUMENTS 9,711,056 B1* 7/2017 Nguyen ................. A61B 5/316
2011/0314375 A1* 12/2011 Zaika ................. G06Q 30/0241
715/708

(Continued)

FOREIGN PATENT DOCUMENTS

CN 103620605 A 3/2014

OTHER PUBLICATIONS

Gubbi, Jayavardhana, et al., "Internet of Things (IoT): A Vision, Architectural Elements, and Future Directions", Department of Electrical and Electronic Engineering, The University of Melbourne, Vic—3010, Australia, Future Generation Computer Systems, 2013; (Year: 2013).*

(Continued)

*Primary Examiner* — Amber A Misiaszek
(74) *Attorney, Agent, or Firm* — Shook, Hardy & Bacon L.L.P.

(57) ABSTRACT

In some implementations, a first set of user activity data is received from a plurality of sensors where the first set of user activity data corresponds to a plurality of users. A task list of an objective is extracted from the received first set of user activity data based on patterns formed in the first set of user activity data in association with the plurality of users pursuing the objective. Based on determining a second set of user activity data indicates pursuit of the objective by a user, it is determined that at least a task of the task list is uncompleted by the user based on comparing the second set of user activity data to the task. Content corresponding to the task is provided to a user device associated with the user based on determining the task is uncompleted.

20 Claims, 6 Drawing Sheets

(56) References Cited

U.S. PATENT DOCUMENTS

| | | | |
|---|---|---|---|
| 2015/0262132 A1* | 9/2015 | Miller | G06Q 10/063114 |
| | | | 705/7.15 |
| 2015/0317073 A1* | 11/2015 | Hull | G06Q 50/01 |
| | | | 715/753 |
| 2016/0248865 A1 | 8/2016 | Dotan-cohen et al. | |
| 2017/0250936 A1* | 8/2017 | Rosenberg | H04L 51/02 |

OTHER PUBLICATIONS

"Second Office Action Issued in Chinese Patent Application No. 201880019431.9", Mailed Date: Jun. 10, 2023, 7 Pages.

"First Office Action and Search Report Issued in Chinese Patent Application No. 201880019431.9", Mailed Date: Dec. 2, 2022, 16 Pages.

Notice of Grant Received for Chinese Application No. 201880019431.9, mailed on Nov. 20, 2023, 4 pages.

U.S. Appl. No. 11/361,266, filed Jun. 14, 2022.

* cited by examiner

USER OBJECTIVE ASSISTANCE TECHNOLOGIES

CROSS-REFERENCE SECTION

The present application claims the benefit of U.S. Non Provisional application Ser. No. 15/464,154, filed Mar. 20, 2017 and entitled "USER OBJECTIVE ASSISTANCE TECHNOLOGIES", the entirety of which is incorporated by reference herein.

BACKGROUND

Users often rely upon computing devices to complete various objectives, such as planning for a trip, preparing for a baby, organizing a party, finding a home, and finding a job. In planning for a trip, for example, a user may visit booking websites to arrange for a hotel, a car, a flight, and sightseeing activities. Further, the user may visit other websites to research available options for the trip, arrange for a doctor visit prior to the trip, and arrange for a babysitter. Computing devices, such as mobile devices including smartphones and tablet devices, are increasingly being integrated with automated personal assistant software, which can assist users in completing their objectives. For example, APPLE® provides "Siri," GOOGLE® provides "Google Now," AMAZON® provides "Alexa," and MICROSOFT® provides "Cortana."

Personal assistant technologies are limited in their capabilities of assisting users in completing objectives. In many cases, a user must provide a query to personal assistant software for specific information, and the personal assistant software provides the user with query results. This approach not only offers a limited amount of assistance to the user, but also wastes significant computing resources (e.g., network bandwidth and power) as the user must seek suitable websites, services, and information using multiple queries, which may need to be refined and may provide query results having marginal relevance to the user's objective. Some personal assistant technologies automatically perform tasks on behalf of users (e.g., surface plane tickets near the airport). However, these technologies are hard coded, task specific, inflexible, and incapable of assisting users in completing objectives across a wide array of possible tasks and domains, which may change over time.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Aspects of the present disclosure provide a framework for inferring tasks of objectives with respect to users, inferring pursuit of objectives based on the inferred tasks, and assisting users in completing tasks of objectives using applications or services, such as bots, to delegate performance of at least some of a task of an objective. Aspects of the present disclosure further provide for tracking completion of tasks by users with respect to particular instances of objectives, as well as inferring user context based on those inferences.

BRIEF DESCRIPTION OF THE DRAWINGS

The present invention is described in detail below with reference to the attached drawing figures, wherein.

DETAILED DESCRIPTION

Figure 1:
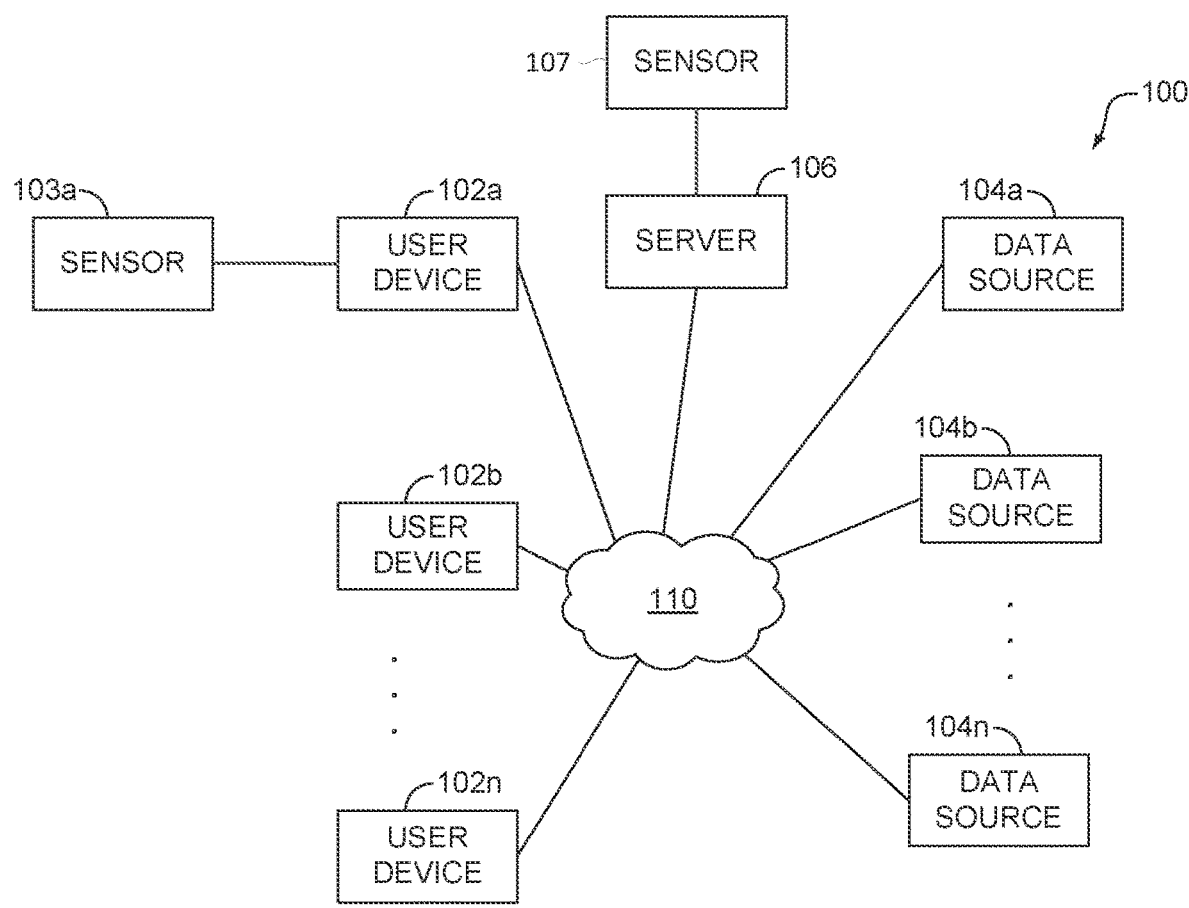
FIG. 1 is a block diagram showing a system for tailoring content to out of routine events in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure provide a framework for inferring tasks of objectives with respect to users, inferring pursuit of objectives based on the inferred tasks, and assisting users in completing tasks of objectives, examples of which include using applications or services, such as bots, to delegate performance of at least some of a task of an objective and presenting the objective and/or one or more tasks of the objective to the user. Aspects of the present disclosure further provide for tracking completion of tasks by users with respect to particular instances of objectives, as well as inferring user context based on those inferences.

In various implementations, tasks of objectives, and objectives themselves, may be inferred by clustering or grouping user activity data corresponding to detected user actions, or events. An event can correspond to a defined user action or grouping of user actions, which may be under defined conditions, such as a time of day, a day of the week, a location, or other computer detectable behavior associated with a user, such as actions associated with geographic locations, semantics of locations, persons with whom the user is with, weather conditions, and more.

Tasks of objectives can be extracted from the clusters or groups of user activity data and assigned to task lists of objectives. Tasks can be based on the strength of various patterns determined in the user activity data, such as those formed by similar events. Tasks may be associated with confidence scores and may be added or removed from task lists of objectives based on updates to confidence scores and/or determinations of new tasks. This may result from re-clustering or updating groupings of the user activity data using subsequently received and/or generated user activity data and/or changes to the strength of associated patterns and/or confidence scores. It is noted that a strength of a pattern could be determined for one or more users (e.g., users having similar user context) relative to a larger set of users (e.g., the total users or general population). In other words, the pattern may be considered strong if it is determined to be sufficiently stronger for the one or more users than the larger set of users.

This approach can allow for detection and identification of tasks which reflect actual user actions performed by users using computing devices. Thus, task lists can be generated and applications, services, and bots can be directed to specific tasks, which are determined to be frequently performed by users. In implementations where groupings and patterns are updated, task lists can be kept contemporary, thereby avoiding wasted resources on irrelevant tasks, new tasks can be identified which can be performed more efficiently by the system than the user, and changes to tasks can be identified such that the system can manage them more accurately and properly.

In further respects, task lists can be generated for users based on personal user context, such as based on patterns of user activity data associated with similar users. Using this approach, task lists can be generated which have increased relevance to particular users. For example, a task list of an objective can include tasks which might otherwise not be included in a task list, but are likely to be performed by a particular user. Thus, a personal assistant application may be unable to assist the user, resulting in the user inefficiently consuming computing resources to accomplish the task. As another possibility, the task list could include tasks which are not likely to be performed by a particular user (e.g., despite being commonly performed by the overall population). In this case, the personal assistant application may waste computing resources by assisting on unhelpful tasks (e.g., content generation and transmission).

In additional respects, performance of tasks can be optionally delegated at least partially to an application, service, or bot. This allows tasks to be completed in a computationally efficient manner, as users are typically inefficient in use of computing resources. For example, a user searching for a flight might extensively search the web looking for the best websites for booking travel, the best airlines to use, coupon codes for the airlines, and reviews on the foregoing from various websites. Instead, using approaches described herein, a computing service could automatically retrieve flight quotes from the websites the system has detected are most commonly used by similar users to book a flight, with the most frequented airlines, and provide this information to the user in single transmission.

In further respects, completion of tasks may be tracked with respect to users and objectives. This can be used to infer a user is pursuing an objective or otherwise determine a level of association between the user and objective, such that content can be prepared, delivered, generated, and/or provided to users in a computationally efficient and accurate manner. For example, some content may be prepared in advance (e.g., for time sensitive delivery) and/or withheld when erroneous or irrelevant. Examples of the content include information identifying the objective and/or one or more tasks of the objective to the user, indications of completed and/or uncompleted tasks of the objective, information determined based on (e.g., inferred from) the one or more tasks and/or objective, and/or information to assist the user in completion of one or more tasks of the objective.

In some implementations, personal user context used to generate a task list include whether users practice a routine and/or are out of routine with respect to one or more routines (e.g., whether the user activity data was generated by a user while out of routine). A user routine, or a routine of a user, can correspond to recurring actions, behavior patterns (e.g., patterns of events), or other habitual computer detectable behavior of a user, such as workout habits of the user, the user's routine of commuting to work, and many more. In this respect, a routine may be defined in terms of one or more events that make up the routine.

In some respects, the present disclosure provides computer technologies for the detection and tracking of instances of events with respect to users. The events can be analyzed with respect to one or more routines. For example, a routine may be identified as corresponding to a user based on patterns formed by detected events (e.g., the user drives to work around 1 PM during weekdays), corresponding to the user, that make up the routine.

In additional aspects of the present disclosure, some events may be identified and/or designated as routine events, or events which are determined to be part of a routine associated with a user. Other events may be identified and/or designated as out of routine events, or events which diverge from or indicate divergence from one or more routines of a user. An out of routine event may be identified based determining the event fails to conform with one or more events that make up a routine of the user. This may include determining the event indicates the user fill fail to practice one or more expected routine events of a routine associated with the user.

In certain respects, routines and events may be analyzed based on accumulated user data that can indicate the occurrence of one or more instances of events of the routines and/or divergences from the routines. Accumulated user data can comprise a collection of data that corresponds to a user. The user data may be continuously collected over time by a large variety of possible data sources and/or data systems that on aggregate forms a detailed record of patterns of user actions, that correspond to one or more routines of the user. These routines and events of the user can be identified, extracted, and/or analyzed from the accumulated user data at a level of scope, accuracy, and quantity that otherwise would not be achievable by the user alone.

It is intended that the accumulation of user data embody robust privacy and data protection for individuals, businesses, and public-sector organizations. In this respect, users are given control over many aspects related to the user data, including the ability to opt in or opt out of data collection and/or any of the various tracking or analysis features described herein. Furthermore, safeguards are to be implemented to protect sensitive user data from access by other parties, including other users, without express consent of the user. Additionally, any user data is intended to be made anonymous, when possible.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107, and network 110. It should be understood that operating environment 100 shown in FIG. 1 is an example of one suitable operating environment. Each of the components shown in FIG. 1 may be implemented via any type of computing device, such as computing device 800, described in connection to FIG. 8, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, a camera, remote control, a bar code scanner, a computerized measuring device, appliance, consumer electronic device, a workstation, or any combination of these delineated devices, or any other suitable device.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

Data sources 104a and 104b through 104n may comprise data sources and/or data systems, which are configured to make data available to any of the various constituents of operating environment 100, or objective management system 200 described in connection to FIG. 2. For instance, in one embodiment, one or more data sources 104a through 104n provide (or make available for accessing) data to user-data collection component 210 of FIG. 2. Data sources 104a and 104b through 104n may be discrete from user devices 102a and 102b through 102n and server 106 or may be incorporated and/or integrated into at least one of those components. In one embodiment, one or more of data sources 104a though 104n comprises one or more sensors, which may be integrated into or associated with one or more of the user device(s) 102a, 102b, or 102n or server 106. Examples of user activity data made available by data sources 104a though 104n are described further in connection to user-data collection component 210 of FIG. 2.

Figure 2:
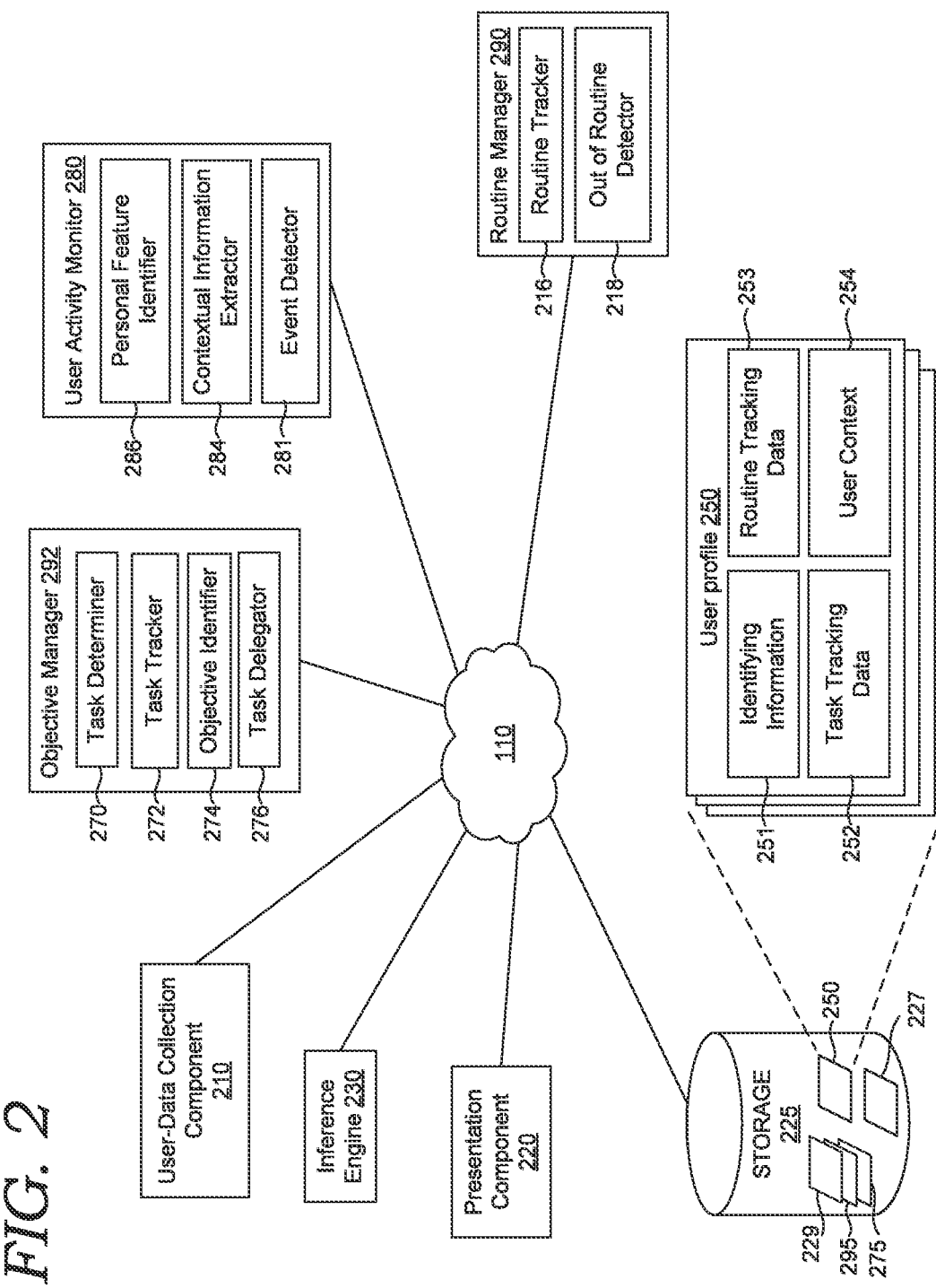
FIG. 2 is a block diagram showing an exemplary objective management system in accordance with implementations of the present disclosure.

Operating environment 100 can be utilized to implement one or more of the components of objective management system 200, described in FIG. 2, including components for collecting user data, inferring routines and routine patterns, generating routine models, generating event details or features, determining tasks and objectives, and/or presenting task or objective related content to users. Referring now to FIG. 2, with FIG. 1, a block diagram is provided showing aspects of an example computing system architecture suitable for implementing an embodiment of the invention and designated generally as objective management system 200. Objective management system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Operating environment 100 can be utilized to implement an objective management system in which routines may be identified, tracked, and analyzed with respect to a plurality of users. Referring now to FIG. 2, FIG. 2 illustrates exemplary objective management system 200, in accordance with implementations of the present disclosure.

Example of an Objective Management System

FIG. 2 provides a block diagram illustrating an exemplary objective management system 200 in which some embodiments of the present disclosure may be employed. In particular, objective management system 200 is one example of a system capable of using user data to determine tasks, associate tasks with objectives, track tasks, identify objectives of users, and delegate tasks to applications, such as bots and services. In some implementations, objective management system 200 can further determine routines from user data, identify and extract events from user data, associate events with routines, and detect and identify out of routine events.

Objective management system 200 includes network 110, which is described in connection to FIG. 1, and which communicatively couples components of objective management system 200, including user-data collection component 210, presentation component 220, storage 225, inference engine 230, routine manager 290, user profile(s) 250, user activity monitor 280, and objective manager 292. The components of objective management system 200 may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of objective management system 200 are associated with one or more personal assistant applications, services, or routines. In particular, such applications, services, or routines may operate on one or more user devices (such as user device 104*a*), servers (such as server 106), may be distributed across one or more user devices and servers, or be implemented in the cloud. Moreover, in some embodiments these components of objective management system 200 may be distributed across a network, including one or more servers (such as server 106) and client devices (such as user device 102*a*), in the cloud, or may reside on a user device such as user device 102*a*. Moreover, these components, functions performed by these components, or services carried out by these components may be implemented at appropriate abstraction layer(s) such as the operating system layer, application layer, hardware layer, etc., of the computing system(s).

Alternatively, or in addition, the functionality of these components and/or the embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example objective management system 200, it is contemplated that in some embodiments functionality of these components can be shared or distributed across other components.

As noted above, it should be understood that objective management system 200 shown in FIG. 2 is an example of one system in which embodiments of the present invention may be employed. Each component shown may include one or more computing devices and may be implemented using operating environment 100 described with reference to FIG. 1. Objective management system 200 should not be interpreted as having any dependency or requirement related to any single module/component or combination of modules/components illustrated therein. Each may comprise a single device or multiple devices cooperating in a distributed environment. For instance, objective management system 200 may comprise multiple devices arranged in a distributed environment that collectively provide any of the various functionality described herein. Additionally, other components not shown may also be included within the environment. It should therefore be understood that objective management system 200 and/or its various components may be embodied by any suitable computer arrangement in accordance with various embodiments of the present disclosure.

Objective management system 200 generally operates to manage objectives with respect to users. As mentioned above, this can include using user data to determine tasks, associate tasks with objectives, track tasks, identify objectives of users, and delegate tasks to applications, such as bots and services. In some respects, events of many users can be identified from user data. The events can be grouped into objectives (e.g., using clustering), and a task list corresponding to the events may be determined for each objective. A tasks list may be personalized to a user based on user personal features, such as personal user context, using events similar to the user personal features. In some cases, an objective corresponds to a user context, and events are grouped into the objective based on being associated with the user context. As will later be described in further detail, one such user context of a user could include the user being out of routine. Another user context could be a user practicing one or more particular routines. Grouping events into objectives based on user context can reduce the amount of user data (e.g., events) which must be analyzed to manage tasks with reject to objectives. For example, only events corresponding to the user context may be clustered.

As mentioned above, each component of objective management system 200, including user-data collection component 210, presentation component 220, inference engine 230, routine manager 290, user profile 250, user activity monitor 280, and objective manager 292 and their respective subcomponents, may reside on a computing device (or devices). For example, the components of objective management system 200 may reside on the exemplary computing device 700 described below and shown in FIG. 6, or similar devices. Accordingly, each component of the objective management system 200 may be implemented using one or more of a memory, a processors or processors, presentation components, input/output (I/O) ports and/or components, radio(s) and a power supply (e.g., as represented by reference numerals 612-624, respectively, in FIG. 6).

As an overview, in some embodiments, user-data collection component 210 facilitates the intake of data and makes the data available to objective management system 200 in association with users (i.e., user data). User activity monitor 280 analyzes the user data in conjunction with inference engine 230 to identify events of users, extract contextual features associated with the user data, and extract personal features of users, such as characteristic features of users and other user context. Using any of the various information from user activity monitor 280 and inference engine 230, routine manager 290 can identify routines of users, associate events with routines of users, and detect when users are, were, or will be out of routine. Also using any of the various information from user activity monitor 280 and inference engine 230, objective manager 292 can determine task lists of objectives with respect to users, track completion of tasks by users, determine objectives of users, and delegate tasks of objectives to bots or services.

As indicated above, inference engine 230 can be used by any of the various components of objective management system 200 to make inferences based on any of the various information available via user-data collection component 210 and user activity monitor 280. For example, inference engine 230 can be used to provide semantic understanding to users, events, and routines, determine associations between users and objectives, track tasks of users, associate tasks with objectives, identify previous routines for events, when available, identify events and routines from user data, determine patterns for routines formed by user data (e.g., formed by events), determine whether an event is a planned or unplanned deviation from a routine, create and/or update routine and/or event models, determine characteristics of users, routines and/or events, correlate events with routines, and determine user context. These functionalities may utilize various pattern information from inference engine 230, which will later be described in further detail.

Presentation component 220 may be used to facilitate the application of objectives and tasks and information association with objectives to user interfaces. Presentation component 220 may further facilitate the application routine models, including information derived therefrom, to user interfaces. This may include presentation component 220 selecting, determining, generating, and/or presenting content to users based on associated tasks, objects, routines, and/or events.

User-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowd-sourced data) for user activity monitor 280 and inference engine 230.

The data may be received (or accessed), and optionally accumulated, reformatted and/or combined, by user-data collection component 210 and stored in one or more data stores such as storage 225, where it may be made available to other components of objective management system 200. For example, the user data may be stored in or associated with user profile 250, as described herein. In various embodiments, any personally identifying data (i.e. user data that specifically identifies particular users) is either not uploaded from the one or more data sources with user data, is not permanently stored, and/or is not made available to user activity monitor 280 and inference engine 230. Further it is contemplated that any features related to user-data collection and retention be optional and at the discretion of individual users.

User data may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both.

By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user data associated with communication events; etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon-.com®, Google®, eBay®, PayPal®, video-streaming services, gaming services, or Xbox Live®), user-account(s) data (which may include data from user preferences or settings associated with a personalization-related (e.g., "personal assistant") application or service, home-sensor data, data from a discrete or physical sensor, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, cellular network, or IP address data), and nearly any other source of data that may be sensed or determined as described herein.

In some embodiments, user data may be provided in at least one user-data stream or "user signal," which can be a feed or stream of user data from a data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses the data continuously, periodically, or as needed.

User data, particularly in the form of event data and/or location data can be received by user-data collection component 210 from one or more sensors and/or computing devices associated with a user. While it is contemplated that the user data is processed, by the sensors or other components not shown, for interpretability by user-data collection component 210, embodiments described herein do not limit the user data to processed data and may include raw data.

User activity monitor 280 is generally responsible for monitoring user data or information that may be used by objective manager 292, routine manager 290, and/or inference engine 230. Any combination of the data generated by user activity monitor 280 may be stored by user activity monitor 280 as user profile(s)/activity data in association with users. For example, data utilized for determining, identifying, and/or tracking events with respect to users may be stored as routine tracking data, such as routine tracking data 253. In addition or instead, data utilized for determining, identifying, and/or tracking tasks and objectives with respect to users may be stored as task tracking data, such as task tracking data 252. This information includes features (sometimes referred to herein as "variables," such as routine or event (e.g., task) features or variables) or other information associated with one or more users.

As an overview, event detector 281 detects events, such as events that may be associated with routines and/or objectives, from user activity. As used herein, an event associated with an objective is referred to as a task. Personal feature identifier 286 is responsible for identifying and optionally determining user features (or variables) associated with a user that may be used for identifying or interpreting patterns (e.g., of events, routines, objectives, or tasks) and other information corresponding to the user. Any of these various components can employ contextual information extracted by contextual information extractor 284 from user data, event-related entities (e.g., documents, files, and other data objects associated with events), and/or detected events in order to support determinations made using those components.

Embodiments of user activity monitor 280 may determine, from the monitored user data, user activity associated with a particular user. As described previously, the user activity information determined by user activity monitor 280 may include user activity information from multiple user devices associated with the user and/or from cloud-based services associated with the user (such as email, calendars, social-media, or similar information sources. User activity monitor 280 may determine current or near-real-time user activity information and may also determine historical user activity information, in some embodiments, which may be determined based on gathering observations of user activity over time, accessing user logs of past activity (such as browsing history, for example), which may be stored in in user profile 250. Further, in some embodiments, user activity monitor 280 may determine user activity (which may include historical activity) from other similar users (i.e., crowd-sourcing), as described previously. For example, user data from other users co-located with the user during an event may be analyzed to determine event features.

In some embodiments, information determined by user activity monitor 280 may be provided to inference engine 230 including information regarding events, contextual features of those events, and historical features (e.g., based on historical observations, which may be provided from records in user profile 250), such as personal features of users.

As indicated above, in some embodiments, the user data and/or information about user activity determined from user activity monitor 280, including event-related information, task-related information, and objective-related information is stored in a user profile, such as user profile 250. This can include routine tracking data 253 and task tracking data 252 extracted using personal feature identifier 286, event detector 281, and/or contextual information extractor 284.

In an embodiment, user activity monitor 280 comprises one or more applications or services that analyze information detected via one or more user devices used by the user and/or cloud-based services associated with the user, to determine project-related activity information and related contextual information. Information about user devices associated with a user may be determined from the user data made available via user-data collection component 210, and may be provided to user activity monitor 280, inference engine 230, routine manager 290, objective manager 292, or other components of objective management system 200. In some implementations of user activity monitor 280, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

User activity monitor 280 may, at least partially, operate to detect user profile activity that is related to events and/or objectives associated with one or more users. Some embodiments of user activity monitor 280, or its subcomponents, may determine a device name or identification (device ID) for each device associated with a user profile. This information about the identified user devices associated with a user profile may be stored in a user profile associated with the user profile, such as in identifying information 251 of user profile 250. In an embodiment, the user devices may be polled, interrogated, or otherwise analyzed to determine information about the devices. This information may be used for determining a label or identification of the device (e.g. a device ID) so that the user profile interaction with the device may be recognized from user profile data by user activity monitor 280. In some embodiments, user profiles may declare or register a device, such as by logging into an account via the device, installing an application on the device, connecting to an online service that interrogates the device, or otherwise providing information about the device to an application or service. In some embodiments devices that sign into an account associated with the user profile, such as a Microsoft® account or Net Passport, email account, social network, or the like, are identified and determined to be associated with the user profile. Information in one or more of these accounts may provide user data user activity monitor 280 may use to determine personal features, contextual information, and events.

In some embodiments, user activity monitor 280, one or more of its subcomponents, routine manager 290, objective manager 292, or other components of objective management system 200, such as inference engine 230, may determine interpretive data from received user data. Interpretive data corresponds to data utilized by the components of objective management system 200 or subcomponents of user activity monitor 280 to interpret user data. For example, interpretive data can be used to provide other context to raw user data, which can support determinations or inferences made by the components or subcomponents (e.g., to infer user activity, events, contextual or personal features, and the like). Moreover, it is contemplated that embodiments of user activity monitor 280, its subcomponents, and other components of objective management system 200 may use user data and/or user data in combination with interpretive data for carrying out the objectives of the subcomponents described herein. Additionally, although several examples of how user activity monitor 280 and its subcomponents may identify user profile activity information are described herein, many variations of user profile activity identification and user profile activity monitoring are possible in various embodiments of the disclosure.

As an overview of user activity monitor 280, contextual information extractor 284 is responsible for determining contextual information related to user profile activity, personal feature identifier 286 is responsible for identifying and optionally determining user features (or variables) associated with a user that may be used for identifying or interpreting patterns, tasks, and other information corresponding to the user, and event detector 281 is configured to detect and/or identify events from user activity data.

As mentioned above, contextual information extractor 284, in general, is responsible for determining contextual information related to user profile activity (e.g., detected by user activity monitor 280), such as context, features or variables associated with routine, objectives, tasks, and/or events (e.g., detected keywords), related information, other user-related activity, and further responsible for associating the determined contextual information with the related events and/or routines. In some embodiments, contextual information extractor 284 may associate the determined contextual information with a related event, task, objective, or routine, and may also log the contextual information with the associated event, task, objective, or routine. Alternatively, the association or logging may be carried out by another service. For example, some embodiments of contextual information extractor 284 provide the determined contextual information to personal feature identifier 286, which can use the information to determine user personal features for the user profile, and event detector 281, which can use the information to identify or detect events.

Some embodiments of contextual information extractor 284 determine contextual information in relation to events (e.g., people or contacts present during a meeting and/or event or invited to a meeting and/or event, such as recipients of a group email, invite, or scheduled meeting, related to the event) or the location or venue wherein the event took place, is taking place, or will take place or is to take place. By way of example and not limitation, this may include contextual features such as location data; which may be represented as a location stamp associated with an event; contextual information about the location, such as venue information (e.g., this is the user's office location, home location, conference room, library, school, restaurant, move theater, etc.) time, day, and/or date, which may be represented as a timestamp associated with the event and which, in some embodiments, may include yellow pages identifier (YPID) information; duration of the event, which may be different than a scheduled duration (i.e., the event was longer or shorter than scheduled); other user events or activities preceding and/or following the event, other information about the event such as entities associated with the event (e.g. venues, participants, contacts, people, objects, etc. which may be invited, in attendance, involved in planning, or otherwise involved), information detected by sensor(s) on user devices associated with the user that is concurrent or substantially concurrent to the event (e.g. location, motion information, online activity, user-device interactions, or physiological information detected on a fitness tracking user device), or any other information related to the event that is detectable that may be used for determining patterns of user-related activity associated with events and routines related to the user.

In embodiments using contextual information related to user devices, a user device may be identified by detecting and analyzing characteristics of the user device, such as device hardware, software such as operating system (OS), network-related characteristics, user accounts accessed via the device (e.g., online calendars), and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user profile. This information about the identified user devices associated with a user profile may be stored in a user profile associated with the user profile, such as in identifying information 251 of user profile 250.

In an embodiment, the user devices may be polled, interrogated, or otherwise analyzed to determine contextual information about the devices. In some implementations, contextual information extractor 284 may receive user data from user-data collection component 210, parse the data, in some instances, and identify and extract contextual features or variables from the data. Contextual variables may be stored as a related set of contextual information associated with an event (e.g., a meeting event), a task, an objective, and/or routine, and may be stored in a user profile such as in routine tracking data 253 or task tracking data 252.

Personal feature identifier 286 is generally responsible for identifying and optionally determining personal features (or variables) associated with the user that may be used for identifying or interpreting patterns and other information corresponding to the user. Personal feature identifier 286 may identify personal features from events, routines, tasks, objectives, and/or explicit information in user data. These user features may characterize, describe, or define a particular user. In some cases, personal feature identifier 286 utilizes contextual information extractor 284 to determine user or personal context for tasks, events, routines, or objectives.

As an example, events can be extracted from user data, as will be described in further detail below, and used to associate the user with one or more routines and/or objectives. When analyzing a particular event, the system can leverage previous semantic knowledge to determine a probability the events are associated with one or more routines, tasks, and/or objectives. This could include comparing the particular event to information derived from events previously associated with routines or objectives (e.g., tasks). It should be appreciated that this concept may be applied various properties of events including search queries, locations, venues, contacts, etc.

Examples of personal features include information about user(s) using the device; information identifying a user, such as a login password, biometric data, which may be provided by a fitness tracker or biometric scanner; and/or characteristics of the user(s) who use the device, which may be useful for distinguishing users on devices that are shared by more than one user. Other examples, include voice identification information, demographic information, frequented venues or locations, search history, search queries, known interests (e.g., subjects, concepts, topics), organizational title, hierarchy within an organization, and information derived therefrom. One or more of these personal features may be derived from patterns of events, tasks, objectives, and routines analyzed by inference engine 230 with respect to the user.

Further examples of personal features include information extracted from requests or communications (e.g., entities), such as time/date, scheduled duration, invitees, importance, responses (e.g. acceptance, tentative-acceptance, declines) proposals or suggestions of alternative times/dates/locations/attendees/other entity features, entity subject(s), file attachments or links in entity-related communications, which may include content of the attachments or links, metadata associated with file attachments or links (e.g., author, version number, date, URL or website-related information); whether the entity is recurring (e.g., a meeting); features from related entities or scheduled entities (where the entity is part of a series, such as recurring meetings or events); location-related features, such as location of an event, location of user device(s) during the event (which may indicate whether a user is present, not present, or attending remotely), venue-related information associated with the location, or other location-related information; time related features, such as time(s) of day(s), day of week or month the event, or the duration of the event, or related duration information such as how long the user used an application associated with the event or how long a user traveled to attend the event; user device-related features (which in some embodiments may be used for identifying user attendance (physical or remote), participation, and/or involvement at events), such as device type (e.g. desktop, tablet, mobile phone, fitness tracker, heart rate monitor, etc.) hardware properties or profiles, OS or firmware properties, device IDs or model numbers, network-related information (e.g. mac address, network name, IP address, domain, work group, information about other devices detected on the local network, router information, proxy or VPN information, other network connection information), position/motion/orientation related information about the user device, power information such as battery level, user-access/touch information; usage related features, such as file(s) accessed, app usage (which may also include application data, in-app usage, concurrently running applications), network usage information, online activity (e.g., subject related searches, browsed websites, social networking activity related to the entity, communications sent or received including social media posts, user account(s) accessed or otherwise used (such as device account(s), OS level account(s), or online/ cloud-services related account(s) activity, such as Microsoft® account or Net Passport, online storage account(s), email, calendar, or social networking accounts, etc.)), features that may be detected concurrent with the event or near the time or the event, or any other features that may be detected or sensed and used for determining a pattern of routine-related activity for the user. In some embodiments, event logic 295 (described in connection to event detector 281) may be utilized to identify specific features from routine-related or objective-related information.

Event detector 281, in general, is responsible for determining (or identifying) an event has occurred, will occur, or is occurring. As used herein, an event corresponds to one or more defined user activities detectable via one or more computing devices. Some embodiments of event detector 281 may monitor user data for routine-related, objective-related, or event-related features or variables corresponding to user activity (e.g., for personal features) such as communications received (e.g., project requests or calendar-related communications), indications of applications launched or accessed, files accessed, modified, copied, etc., websites navigated to, online content downloaded and rendered or played, user location or change of location (e.g. user is located in or has changed locations to a conference room) or similar user activities.

Each event may have a corresponding event definition that comprises one or more conditions and optionally one or more tracked variables. Conditions are utilized by event detector 281 to determine whether instances of events have occurred and should be detected. In particular, event detector 281 may detect that an instance of an event has occurred based on determining that the conditions corresponding to the event are met.

Any of a variety of conditions may be placed upon detection of an instance of an event. In some respects, one or more conditions of an event may be satisfied by having user data corresponding to the event available to event detector 281. As an example, an instance of an event corresponding to a blood pressure reading of a user may be conditioned upon a blood pressure reading being available for a routine of monitoring the blood pressure of the user.

Events may optionally comprise one or more event variables. Event variables comprise data fields that may be populated with data generated from user data by event detector 281, as provided by user-data collection component 210. Events having one or more event variables may also be referred to as variable events. Other events may be static and can be referred to as static events.

In some cases, conditions of events may employ one or more event variables. For example, one or more conditions of an event may place one or more constraints on values provided by user data for one or more event variables of the event. For example, the event may require that the blood pressure reading is within a designated range for an instance of the event to have occurred.

Tracked variables are event variables that are assigned and/or recorded by event detector 281 with respect to a corresponding detected instance of an event. In particular, values corresponding to the tracked variables may be stored in association with a user, for example, with respect to a corresponding one of user profiles 250, in routine tracking data 253 and/or task tracking data 252.

Tracked variables can correspond to any of a variety of user data, examples of which have been described above and include sensor data or readings, which may be sensed by one or more sensors (such as information associated with a user device regarding location, position, motion/orientation, user-access/touch, connecting/disconnecting a charger, user activity on the user device, or other information that may be sensed by one or more sensors, such as sensors found on a mobile device) GPS coordinate samples, and many more. It will be appreciated that values of tracked variables may be associated with one or more events and/or routines and need not be event or routine specific. An example of a tracked variable is a time stamp corresponding to a respective instance of the event. The time stamp can indicate the relative order or sequence of an instance of an event with respect to other instances of the event, and optionally instances of one or more other events of a corresponding routine.

As a further example, an event may comprise a user arriving at a store. One tracked variable may correspond to an arrival location, such as an arrival location name. In detecting the event, event detector 281 may infer the arrival as being satisfied based on user data comprising GPS data on the user's phone (e.g., user device 102a of FIG. 1), wherein the arrival location name is identified as a store and stored based on interpretive data that includes map data used to associate coordinates from the user's phone with a corresponding location name. Thus, for one instance, the arrival location name may be "Walmart," and for another instance, the arrival location name may be "Target," as examples. However, it will be appreciated that the level of granularity in the detection and tracking of events can vary. Thus, as an example, an arrival location name need not be a tracked variable. Furthermore, other examples of potential tracked variables, or more generally event variables, include arrival time (e.g., a time stamp), arrival location coordinates, driving speed, gas mileage, vehicle name, and many more.

Additionally, some embodiments of event detector 281 use contextual information extractor 284 to extract from the user data information about events or associate contextual information with the events, which may include current activity, historical activity, and/or related information such as contextual information. Alternatively, or in addition, in some embodiments event detector 281 uses contextual information extractor 284 to determine and extract contextual information that is related to one or more events, tasks, objectives, or routines.

Examples of event-related activity information, that can be extracted by contextual information extractor 284 and used by components of user activity monitor 280, such as event detector 281, may include information describing app usage, online activity, searches, calls, usage duration, application data (e.g., project requests, emails, messages, posts, user profile status, notifications), or nearly any other data related to a user that is detectable via one or more user devices or computing devices, including user interactions with the user device, activity related to cloud services associated with the user (e.g., calendar or scheduling services), online account activity (e.g. email and social networks), and social network activity.

As with other components of objective management system 200, the extracted event information determined by event detector 281 may be provided to other subcomponents of user activity monitor 280, inference engine 230, presentation component 220, routine manager 290, objective manager 292, personal feature identifier 286, or other components of objective management system 200. Further, the extracted event information may be stored in a user profile associated with the user, such as user profile 250. In some embodiments, event detector 281 or user activity monitor 280 (or its other sub components) performs conflation on the detected event-related information. For example, overlapping information may be merged and duplicated or redundant information eliminated.

In some embodiments, the user data may be interpreted to determine an event has occurred, is occurring, or will occur. For example, in some embodiments, event detector 281 employs event logic 295, which may include rules, conditions, associations, classification models, or other criteria to identify event-related activity, such as objective-related activity. For example, in one embodiment, event logic 295 may include comparing event criteria (e.g., conditions described above) with the user data in order to determine that an event has occurred.

In some embodiments, event detector 281 runs on or in association with each user device for a user. Event detector 281 may include functionality that polls or analyzes aspects of the user device, which may include online- or cloud-services accessible via the user device, to determine project-related features, such as sensor output, applications running (and in some instances the content of the applications), network communications, online/cloud activity related to the user, and/or other user actions detectable via the user device including sequences of actions.

In some cases, event detector 281 identifies an event based on determining the event occurred or will occur, which may be based on a confidence score or other metric evaluating whether the event occurred or will occur. In other cases, events can be explicit in user data. Example of explicit events include calendar items, such as meetings, and the like. One or more of these events may be correspond to a data object having content explicitly defined or definable by one or more users (e.g., the message body of an email, start and end times of a meeting).

In some cases, event detector 281 is utilized by routine manager 290 to identify events is association with routines. In addition or instead, event detector 281 may be utilized by objective manager 292 to identify events in association with objectives. For example, task tracker 272 may identify tasks using event detector 281. This could include identifying events in association with objectives and/or classifying events as tasks of objectives. In addition or instead, routine tracker 216 may identify events in association with routines and/or classify events as being part of one or more routines.

In some embodiments, event detector 281 identifies events using contextual information or features associated with one or more routines and/or objectives. For example, contextual information associated with user activity involving a meeting may comprise entity information and characteristics such as emails accessed during the meeting, location of the meeting or of the user during the meeting, photos taken during a meeting, users or contacts attending or invited to the meeting, files accessed or created during the meeting, search queries provided during the meeting such as file searches performed during the meeting or web searches performed during the meeting, and the like. Using characteristics of a routine or objective formed by patterns of associated historical events, event detector 281 may determine this activity corresponds to a routine-related event.

In some embodiments, the identification and/or classifying of events (e.g., as part of objectives and/or routines) can be based on feature-matching or determining similarity in features, which may be carried out using statistical classification processes Thus, event logic 295 may comprise pattern recognition classifier(s), fuzzy logic, neural network, finite state machine, support vector machine, logistic regression, clustering, or machine learning techniques, similar statistical classification processes or, combinations of these to identify events from user data. Accordingly, event logic 295 can take many different forms depending on the mechanism used to identify an event, and may be stored in storage 225. For example, event logic 295 might include training data used to train a neural network that is used to evaluate user data to determine when an event has occurred. Moreover, event logic 295 may specify types of event features or user activity such as specific user device interaction(s), that are associated with an event, accessing a schedule or calendar, accessing materials associated with a routine (e.g., an agenda or presentation materials in a meeting), composing or responding to a scheduling request communications, acknowledging a notification, navigating to a website, or launching an app. In some embodiments, a series or sequence of user-related activity may be mapped to an event, such that the event may be detected upon determining that the user data indicates the series or sequence of user-related activity has occurred or been carried out by the user.

In various implementations, event detector 281 identifies events in association with one or more email applications. This can be from information (e.g., entities) generated or accessed by an email application or in association with an email application, based on the information being referenced by or to an email application, and/or based on the information being used by or in association with an email application. For example, event detector 281 can analyze emails and/or meeting invites that are sent or received using the enterprise application, attachments to emails or meetings, as well as meetings themselves. Contextual information extractor 284 can be used to extract context for this activity from the various metadata of a meeting invite or other calendar item, such as attachments, titles, subject lines, locations, confirmed participants, invited participants, and the like associated with the user activity. Other sources of information include contacts from the email application and/or from a global contacts list associated with users, which may include a contacts list tracked across user devices and/or integrated into operating system software.

Continuing with objective management system 200 of FIG. 2, inference engine 230 is generally responsible for generating inferences for any of the various components of objective management system 200 such as routine manager 290, objective manager 292, and user activity monitor 280. This may include determining patterns based on the various information determined from user activity monitor 280. For example, in some cases, inference engine 230 can be used to determine one or more patterns formed by events and associate the one or more patterns with one or more routines or objectives of a user. As a further example, inference engine 230 may determine user context 231 or semantic information of events, objects, tasks, and/or routines using one or more patterns formed by the events. This information can correspond to and/or be used to personal features identified by personal feature identifier 286 and/or other contextual information.

Inference engine 230 may in some cases receive events, event-related entities, contextual information, personal features, user activity data, and/or other user data, at least some of which is provided using user activity monitor 280, or its subcomponents, in order to form inferences.

Routine manager 290 comprises routine tracker 216 and out of routine detector 218. Routine tracker 216 is configured to identify routines of one or more users from user data and/or associate events with routines. In some cases, the identification of routines for users is adaptable, such that a routine identified for a user may no longer be identified for the user in the future based on changes in user behavior over time (e.g., changes in behavior patterns). Out of routine detector 218 is configured to detect or identify divergence between users and their routines. In various implementations, out of routine detector 218 may be utilized to detect or identify events indicating that users will diverge from, are diverging from, or have diverged from one or more routines. In some cases, routines of users may be adapted over time based on changes in user behavior, so as to more accurately detect and identify divergence from those routines (e.g., to adapt to changes in user behavior patterns).

Although routine tracker 216 and out of routine detector 218 are shown as separate components, at least some functionality may be shared between the components. For example, the identification of a routine or event may be implicit in the functionality of out of routine detector 218. As an example, out of routine detector 218 may consider the strength of patterns (indicating routine) formed by detected events in determining whether an out of routine event should be identified. It will therefore be appreciated that not all implementations described herein require both routine tracker 216 and out of routine detector 218.

Routine tracker 216 and out of routine detector 218 may employ accumulated user data and/or interpretive data from one or more data sources, such as any of the various information provided by user activity monitor 280 (e.g., contextual information and personal features) and inference engine 230. Using this information, routine manager 290 can associate events of users with routines, as will later be described in further detail.

Routine manager 290 may optionally identify and track routines and identify out of routine events based on routine models 229 that correspond to the routines. Routine models 229 correspond to representations of corresponding routines. Each routine model comprises one or more events that make up a corresponding routine (e.g., the events routine tracker 216 associates with the routine) and is defined by one or more patterns formed by the events, as later described in further detail.

Routine manager 290 may search and/or analyze user data for any of a variety of events and/or event variables thereof. By matching user data to one or more events and/or event variables thereof, routine manager 290 may detect events and identify routines from patterns of detected events for users, as well as identify and detect potential or actual divergences from events of the routines with respect to the users.

Some examples of how routine tracker 216 may make such determinations are described herein. However, many variations of routine identification and tracking are possible. In some cases, in determining whether a user practices a routine, routine tracker 216 can determine a confidence score of the routine, and/or respective confidence scores of the one or more events of the routine. Where a confidence score of a routine exceeds a threshold value, routine tracker 216 may determine that the user practices the routine. Similarly, where a confidence score of an event exceeds a threshold value, routine tracker 216 may determine that the user practices the event.

A confidence score may correspond to a relative strength of a corresponding modeled pattern appearing in distributions of one or more values of tracked variables of detected events associated with the routine. The confidence score may be impacted by various factors, such as the variance in the patterns, the age of detected events forming the patterns, and the number of detected events forming the patterns. In some cases, where all confidence scores of all events assigned to a routine exceed their respective threshold values, routine tracker 216 may determine that the user practices the routine. It should be noted that any combination of the aforementioned threshold values may be the same or different with respect to one another.

Confidence scores of events and/or routines can be determined by utilizing one or more confidence metrics. In some implementations, confidence metrics increase confidence scores based on detected repetitions or iterations of events and/or routines over time as indicated in patterns formed by the detected events. Confidence scores may be discounted based on lapsed time with respect to one to all of the repetitions or iterations. For example, a confidence score that may have been high in the past may be low in the present based on corresponding user behavior or behaviors having occurred far in the past. As another example, iterations may be phased out from consideration and/or storage over time. In this way, routine tracker 216 can adapt to changing lifestyles in which users may alter their behaviors over time.

As indicated above, any of the various data employed in tracking and identifying routines of users may be stored as routine tracking data 253. In some cases, routine tracking data 253 optionally includes entries that identify routines and assignments between routines and one or more users. The entries may store or otherwise indicate any of the various data associated with a routine, such as events of the routine and/or values associated with tracked variables of those events. Routine tracking data 253 may also comprise confidence scores that correspond to one or more users with respect to events and/or routines. As indicated above, over time, routine manager 290 may update routine tracking data 253 as user data is periodically analyzed and confidence scores are determined and/or updated.

Out of routine detector 218 may utilize routine tracking data 253 to detect or identify that a user is out of routine based on determining that the user will diverge from, is diverging from, or has diverged from one or more routines of the user. In this respect, out of routine detector 218 may identify one or more out of routine events. In some cases, an event may be out of routine for a routine where it is determined that a user will diverge from, or has diverged from, the event with respect to the routine. In this regard, a divergence can correspond to a departure from a modeled pattern of detected events for the routine. Patterns may be modeled using statistical models, such as parametric models, or other suitable models, and may be analyzed to identify divergences therefrom.

It will be appreciated that in some cases, an event may be identified as out of routine based on an actual divergence from the event where user data indicates that the user has already violated some condition or pattern of the routine, as opposed to a predicted divergence from the event where user data indicates that the user is likely to violate some condition or pattern of the routine. An example of an out of routine event may be a user performing one or more user actions (e.g., events) at a time when they usually don't perform that action. In some cases, the user may make a phone call at a time when they usually don't make phone calls. In others, the user may send an email late at night when the user typically does not send emails. However, events need not be identified as out of routine based on temporal divergences. An example is identifying an out of routine event based on a child (i.e., user) communicating with a person they usually do not communicate with online. Another example is identifying an out of routine event based on a child (i.e., user) visiting a web site the child typically does not visit. Yet another example is identifying an out of routine event based on unusual patterns (e.g., erratic behavior) in a user's driving behavior (e.g., as indicated by one or more gyroscopes, accelerometers, and/or other sensor data in the vehicle the user is driving and/or the user's cellular phone). A further example would be a user planning a vacation over a period in which they are usually working (e.g., out of work-related routines).

Thus, it will be appreciated that an event may be identified as out of routine based on a prediction of divergence from the routine. In this way, identification of out of routine events can be forward looking. A prediction of a divergence may be based on interpretive data, detected events, and one or more inferences as to future user actions or events. As an example, a user may usually go to the park every Tuesday but out of routine detector 218 may predict that the user may not walk in the park next (i.e., participate in this routine event) Tuesday based on a weather forecast indicating a high chance for rain on Tuesday. Another example is where the user is identified or detected at the park on a Monday and out of routine detector 218 predicts that the user may not visit the park the following Tuesday because the user's pattern indicates that the user typically visits or walks in the park only once per week.

An example of an actual divergence from an event is a user missing a meeting the user typically attends every Wednesday. An example of a predicted divergence is a prediction that the user will miss the meeting prior to detecting that the user has actually missed the meeting. For example, out of routine detector 218 may infer that the user will miss the meeting based on determining that the user will be on vacation and out of town during the meeting. The determination may be based on one or more detected events and/or user data, such as calendar scheduling data.

An event may be identified as out of routine based on determining that a user has not, will not, or may not satisfy a predicted instance of the event for the routine. For example, out of routine detector 218 may analyze historical detected events for patterns in values of one or more tracked variables, so as to predict value ranges of one or more of the tracked variables to define the predicted instance of the event. Where it is determined that a user has not, will not, or may not satisfy the predicted value ranges, an out of routine event may be detected. As an example, out or routine detector 218 may analyze a distribution of times (e.g., using time stamp values) a user has gone out to lunch in the past and predict that a user will go to lunch between 12:00 PM and 1:00 PM. Based on detected events that indicate the user has not left since arriving at work, after 1:00 PM, out of routine detector 218 may identify the event as out of routine, based on an actual divergence. As another example, based on detected events that indicate the user has scheduled a lunch meeting for the day at 11:30 AM, out of routine detector 218 may identify the event as out of routine, based on a predicted divergence.

As indicated above, patterns of detected events may be employed in identifying that routines correspond to users and/or in detecting divergence from the routines. For example, out of routine detector 218 may detect an out of routine event based upon detecting a divergence from a modeled pattern of one or more tracked variables of the event of the routine.

Exemplary approaches are described below, where each instance of an event has corresponding historical values of tracked variables that form patterns and routine manager 290 may evaluate the distribution of the tracked variables for patterns. In the following example, a tracked variable for an event is a time stamp corresponding to an instance of the event. However, it will be appreciated that, conceptually, the following can be applied to different types of historical values.

A bag of time stamps (i.e., values of a given tracked variable) can be denoted as $\{t_m\}_{m=1}^M$, and mapped to a two-dimensional histogram of hours and days of the week. The two-dimensional histogram can comprise a summation over the instances of the event, such as:

$$h_{ij} = \Sigma_{m=1}^M I[\text{dayOfWeek}[t_m]=i] \wedge I[\text{hourOfDay}[t_m]=j].$$

This histogram can be used to determine derivative histograms. For example, a day of the week histogram may correspond to:

$$h_j = \Sigma_i h_{ij}.$$

An hour of the day histogram may correspond to:

$$h_i = \Sigma_j h_{ij}.$$

As further examples, one or more histograms may be determined for particular semantic time resolutions in the form of:

$$h_{iC} = \Sigma j \in C h_{ij}.$$

Any of various semantic time resolutions may be employed, such as weekdays and weekends, or morning, afternoon, and night. An example of the latter is where C ∈ {morning, afternoon, night}, morning={9, 10, 11}, afternoon={12, 13, 14, 15, 16}, and night={21, 22, 23, 24}.

An additional data structure utilized in representing an event can comprise the number of distinct time stamps in every calendar week that has at least one time stamp therein, which may be represented as:

$$w_i^j = \|\{m | t_m \text{ is within the } i\text{-th } j \text{ week period}\}\|.$$

As an example, $w_2^3$ can denote the number of distinct time stamps during the $2^{nd}$ three-week period of available time stamps. $N^{(j)}$ may be utilized to denote the number of j-week time stamps available in the tracked data, for example, $N^{(3)}$ denotes the number of three-week periods available in the time stamps.

Routine manager 290 may generate a confidence score that quantifies a level of certainty that a particular pattern is formed by the historical values in the tracked variable. In the following example, the above principles are applied utilizing Bayesian statistics.

In some implementations, a confidence score can be generated for a corresponding tracked variable that is indexed by a temporal interval of varying resolution. For time stamps, examples include Tuesday at 9 AM, a weekday morning, and a Wednesday afternoon. The confidence score may be computed by applying a Dirchlet-multinomial model and computing the posterior predictive distribution of each period histogram. In doing so, a prediction for each bin in a particular histogram may be given by:

$$x_i = \frac{\alpha_0 + h_i}{\sum_i^K (\alpha_0 + h_i)}.$$

Where K denotes the number of bins, $\alpha_0$ is a parameter encoding the strength of prior knowledge, and $$i^* = \underset{i}{\text{argmax}} x_i.$$

then, the pattern prediction is the bin of the histogram corresponding to i* and its confidence is given by $x_{i*}$. As an example, consider a histogram in which morning=3, afternoon=4, and evening=3. Using $\alpha_0=10$, the pattern prediction is afternoon, and the confidence score is $$\frac{10+4}{(10+3)+(10+4)+(10+3)} = \frac{14}{40} \approx 0.35.$$

In accordance with various implementations, more observations results in an increased confidence score, indicating an increased confidence in the prediction. As an example, consider a histogram in which morning=3000, afternoon=4000, and evening=3000. Using a similar calculation, the confidence score is $$\frac{4010}{10030} \approx 0.4.$$

Also, in some implementations, a confidence score can be generated for a corresponding tracked variable that is indexed by a period and a number of time stamps. Examples include 1 visit per week, and 3 visits every 2 weeks. Using a Gaussian posterior, a confidence score may be generated for a pattern for every period resolution, denoted as j. This may be accomplished by employing the formula:

$$\widehat{\mu^{(j)}} = \lambda\left(\frac{1}{N^{(j)}}\sum_i^{N^{(j)}} w_i^{(j)}\right) + (1-\lambda)\mu_0, \text{ where } \lambda = \frac{\sigma_0^2}{\frac{\sigma^2}{N^{(j)}} + \sigma_0^2}.$$

In the foregoing, $\sigma^2$ is the sample variance, and $\sigma_0^2$ and $\mu_0$ are parameters to the formula. A confidence score can be computed by taking a fixed interval around the number of time stamps prediction and computing the cumulative density as:

$$conf_j = P(|x - \widehat{\mu^{(j)}}| < a) = \int_{\widehat{\mu^{(j)}}-a}^{\widehat{\mu^{(j)}}+a} \mathcal{N}(x|\widehat{\mu^{(j)}}, \hat{\sigma}^{(j)}),$$

$$\text{where } \hat{\sigma}^{(j)} = \frac{1}{\frac{N^{(j)}}{\sigma^2} + \frac{1}{\sigma_0^2}}.$$

As an example, consider the following observations: $w_1^{(1)}=10$, $w_2^{(1)}=1$, $w_3^{(1)}=10$, $w_4^{(1)}=0$, $w_1^{(2)}=11$, and $w_2^{(2)}=10$. $N^{(1)}=4$ and $N^{(2)}=2$. Using $\mu_0=1$ and $\sigma_0^2=10$, $\mu^{(1)}=4.075$, and $conf_1=0.25$. Furthermore, $\mu^{(2)}=10.31$ and $con\ f_2=0.99$. In the foregoing example, although fewer time stamps are available for two week periods, the reduced variance in the user signals results in an increased confidence that a pattern exists.

Having determined that a pattern exists, or that the confidence score for a pattern is sufficiently high (e.g., exceeds a threshold value), routine manager 290 may identify that a routine corresponds to a user and/or whether one or more instances or predicted instances of a routine or event diverge from the routine using one or more of these values.

As an example, out of routine detector 218 may determine whether a value of the tracked variable of the routine diverges from or will diverge from that pattern (e.g., based on one or more detected events). For example, out of routine detector 218 may determine that a value of a tracked variable of a predicted instance of a corresponding event of a routine, diverges from or will diverge its expected values. These expected values may be formed by patterns of the historical values of the tracked variable with respect to the routine and represent a characteristic feature of the routine for the user. In some cases, a divergence may be detected where the value is greater than or equal to approximately one standard deviation from the time stamps of the pattern. In some cases, a divergence may be detected where the value is greater than or equal to approximately two standard deviations from the time stamps of the pattern. The standard deviation may be established by mapping a function to the time stamps of the pattern, such as a Gaussian function, or bell curve, as an example.

As a further example, routine tracker 216 may determine that an event of a routine is being practiced by a user (e.g., a detected event is part of or consistent with a routine) where one or more of the confidence scores for one or more tracked variables exceed a threshold value. In this regard, an event of a routine may be determined as being practiced based on routine tracker 216 identifying one or more patterns in historical values of one or more tracked variables of the event.

In tracking routines and events with respect to users, routine manager 290 may employ place prediction, which may be implemented using the histogram model indexed using the temporal interval, as described above. Using the current time, the histogram model may be applied to each of the known places. Each place of these places can yield a probability that estimates a portion of visits to the place at the current time:

$$P(\text{Place}=p\,|\,\text{time}=t) = \frac{P(\text{time}=t\,|\,\text{Place}=p)P(\text{Place}=p)}{\sum_{p'} P(\text{time}=t\,|\,\text{Place}=p')P(\text{Place}=p')}.$$

Quantity P (time=t|Place=p) is the histogram model described above. P(Place=p) is the prior probability of being in place p. The resolution of time t is relaxed in from narrow to broad (e.g., Tuesday At 9 AM→Weekday Morning) until the above quantity surpasses a threshold, in which case our model predicts place p.

Further, in tracking routines with respect to users, routine manager 290 may employ next place prediction, which may be implemented using the histogram model indexed by a period and a number of time stamps (i.e., samples), as described above. Using this model, the expectation for a visit in a particular week using the previous number of visits can be computed using the formula:

$$P(\text{time}=t\,|\,\text{Place}=p,\text{Week}=w) =$$
$$\begin{cases} P(\text{time}=t\,|\,\text{Place}=p)\left(\frac{\#\text{of visits for week }w-}{\text{Expected Number Of Visits for week }w}\right) > 0 \\ 0 \quad\quad\quad\quad\quad\quad\quad\quad\quad\quad\quad\quad\quad \text{otherwise} \end{cases}$$

The expected number of visits per week is computed using the period with the highest confidence.

Objective manager 292 includes task determiner 270, task tracker 272, objective identifier 274, and task delegator 276. Objective manager 292 is generally responsible for managing objectives with respect to users. Task determiner 270 is configured to determine tasks of objectives, such as by compiling a task list, or checklist of tasks for each objective. Task tracker 272 is configured to track tasks with respect to objectives and users, such as based on detecting a task has, is, or will be completed by a user. Objective identifier 274 is configured to associate objectives with users. Task delegator 276 is configured to delegate tasks to applications or services, such as bots.

As mentioned above, task determiner 270 determines tasks of objectives, such as by compiling a task list, or checklist of tasks for each objective. In various implementations, task determiner 270 determines a task list of an objective using machine learning. The machine learning can use crowd-sourced data from many users to learn which events characterize an objective. These events may be used as tasks in a task list of the objective. For example, task determiner 270 may determine that when finding a home, users typically participate in events including visiting house listing websites, searching for realtor, acquiring a loan, and searching for information about schools in particular areas. Thus, one or more of these events may be used as a task in a task list.

In some implementations, task determiner 270 determines task lists for objectives based on extracting patterns of events from user activity data. The patterns may be extracted from user activity data using any suitable machine learning approach, including unsupervised or supervised learning approaches, to learn task lists for objectives. In doing so, factors and features employed in the pattern extraction and analysis can include any combination user context (e.g., personal features) and event context. For example, patterns could be extracted from the user activity data based on any combination of these various factors. In addition or instead, any combination of the factors may be used to filter user activity data (e.g., events), and the filtered user activity data may be analyzed for patterns. As a further option, any combination of the factors may be used to determine sub-patterns from patterns and/or further filter the patterns or information derived therefrom. Task lists may be extracted from any of the various patterns of user activity data.

In some approaches task determiner 270 determines patterns as clusters of user activity data (e.g., events). From the clusters, or groups of user activity data, task determiner 270 can learn in-common events, activities, and/or event context for particular objectives amongst the users. Task determiner 270 can generate a task list of an objective from the clusters of user activity data. For example, in some cases, each task may correspond to one or more respective clusters. Further, a cluster may be incorporated into a task list or used to generate a task based on a confidence score associated with the cluster (or more generally the pattern). The confidence score of a cluster may, for example, correspond to the cluster's cohesion score, or other validation metric for a pattern.

In some cases, to incorporate clusters into a task list of an objective, task determiner 270 analyzes the one or more clusters. Based on the confidence scores of the clusters, task determiner 270 can utilize event detector 281 to detect events associated with the clusters. One or more of these events may be incorporated into the task list as tasks. For example, event detector 281 can extract or detect events from the user activity data of a cluster and/or user activity data (e.g., events) associated with the user activity data of the cluster. As an example, task determiner 270 may determine user activity data associated with user activity data of a cluster based on the data being temporally related to the user activity data of the cluster. In some embodiments, this temporal relationship may correspond to user activity data which represents user behavior occurring prior to a time associated with the cluster (e.g., events or clusters of events leading up to events of the cluster). As indicated above, tasks may be determined from at least some of these events.

Using personal user context, task determiner 270 can, for example, determine patterns of user activity corresponding to similar users when pursuing an objective. This allows tasks lists to be personalized to users. For example, any of the various personal user context determined using personal feature identifier 286 could be employed. In some cases, at least some of the user context can define a particular objective. For example, a user context could be that the user is looking for a house, which itself may correspond to an event and be determined using event detector 281, with tasks corresponding to sub-events of the event. Task determiner 270 can analyze user activity data from users having this common objective to create a task list. For example, once user activity monitor 280 is sufficiently confident a user is pursuing or has pursued, or has completed an objective (e.g., event or event with particular context), task determiner 270 may identify events corresponding to the pursuit of the objective. This could include, for example, determining events based on a start time and/or end time of the pursuit of the objective (e.g., within the time range) for pattern analysis and extraction (the events could be further filtered by other factors and features).

As an example, of personal user context, users who are planning a trip to a foreign country may participate in different events than users traveling domestically. For example, foreign travelers may obtain flu shots, obtain a visa, and research foreign cellular plans, and the like, which domestic travelers typically would not do. By filtering the data by this user context, relevant task lists may be generated for users. Thus, computing resources need not be wasted assisting users in or otherwise providing content to users for non-relevant tasks.

It is noted a task list for a user may be generated from a more comprehensive task list. For example, a more general planning a trip task list could be filtered for tasks relevant to the user context to include in a task list for a user. Also, it is noted user context could be used to provide event variables for tasks in a task list. In the example above, an event variable could be a destination country or location for a trip.

Using event context, task determiner 270 can, for example, determine patterns of user activity corresponding to similar events when pursuing an objective. This allows tasks lists to aggregate similar events into tasks. For example, any of the various event context determined using contextual information extractor 284 could be employed. One example, of event context can include temporal features of events. Temporal features of events may correspond to time stamps of the events, such as has been described above. For example, task determiner 270 may determine patterns in events formed by their time stamps and/or based on characteristics determined using their time stamps. This could include, for example, determining a time stamp of an event meets some time based criteria relative to one or more other times, durations, events, and/or event types. Other examples of event context have been described above.

As an example of the forgoing, task determiner 270 may identify a personal user context for one or more users, such as a user going on vacation, and using temporal features of events and other user activity data and signals, playback the recorded user data to determine and identify patterns that predict the personal user context. For example, a pattern may indicate users planning for a vacation often book a flight, book a hotel, update a visa, arrange for medical shots, arrange for a pet sitter, and the like, prior to a time associated with the vacation. Thus, corresponding tasks may be included in a task list for preparing for the vacation. It should be appreciated that additional personal user context may define the tasks of the task list.

In some implementations, a factor or feature utilized by task determiner 270 to determine task lists includes whether the user activity data corresponds to a user who is, was, or will be out of routine, and/or out of one or more particular routines or category/type of routine. These determinations can be made using out of routine detector 218, as has been described above, and may correspond to a type of personal user context and/or event context.

As an example, out of routine related user activity data represents situations which users may be unaccustomed to, and therefore task lists and/or objectives related to those situations may be most useful to users. Basing task lists on identified out of routine related user activity data can significantly narrow the user activity data to be analyzed by task determiner 270, thereby saving significant computing resources. For example, instead of analyzing all users at all times, this list of users and times can be narrowed for application to machine learning algorithms. As an example, events may be clustered or otherwise analyzed for patterns of user activity data based on determining or identifying the user activity data corresponds to out of routine events and/or corresponds to out of routine users (e.g., users in a similar context).

Users who are out of routine may be more thorough in pursing objectives, as opposed to users in routine. In particular, in routine users may skip steps (e.g., tasks) in completing objectives. Therefore, more comprehensive task lists may be identified and/or patterns may be stronger in this data set. As an example of the forgoing, assume, an objective corresponds to planning for a trip. A task for planning for a trip may include obtaining a visa. However, users who fly often may already have a visa, which can reduce the frequency of occurrence of this event in the aggregated user activity data. By focusing on users for which this objective is out of routine, a larger proportion of users will have obtained a visa, resulting in a stronger pattern in the data.

As indicated above, a task may be included in a task list based on a conditional probability a user in similar context will pursue the task. Each task may be associated with a conditional probability, which corresponds to the strength of a pattern of a corresponding event(s) in the user activity data. Further, any number of tasks may be included in a task list of a particular objective (e.g., based on the conditional probabilities of the tasks). For example, a task may be included in a task list based on the task's conditional probability exceeding a threshold value. However, in some cases, at least some high probability tasks (e.g., exceeding a second threshold value) may be filtered out from consideration of being included in a task list. This may occur prior to pattern analysis and/or after the conditional probability is determined for the task. At least some of these high probability tasks may be filtered based on determining the tasks do not characterize the objective relative to other objectives (e.g., by comparing patterns of multiple objectives). For example, regardless of objective, users may get gas or eat dinner.

Furthermore, using conditional probabilities, task lists may be updated over time. For example, conditional probabilities may change over time as events user's tend to perform in pursing objectives change. Therefore, it is contemplated the machine learning be dynamic such that the tasks included in a task list can change according to changes in conditional probabilities. Further, new tasks could be detected and included in task lists by updating the machine learning models with more contemporary user activity data. As an example, suppose an objective comprises to a user traveling to Canada. Task determiner 270 can detect, for example, that users have recently been obtaining and filling out a travel form required by a new law, and include this task in the task list.

Task determiner 270 can further to extract task characteristics of a task from the user activity data corresponding to the task. For example, a task characteristic for a task can be generated from event corresponding to the task (e.g., events of the cluster). This can include event context of the events and event variables. For example, using event variables associated with a user searching for a wedding venue, task determiner 270 can determine a set of most common websites (a set refers to one or more) visited by users when pursuing this event and assign these websites as a task characteristic. As another example, for an event corresponding to a user acquiring travel insurance, task determiner 270 can determine a set of most common travel insurance plans, and assign these plans as a task characteristic. Each task may have any number of task characteristics, which may be derived from pattern information of the user activity data and can be updated over time as these characteristics change in more contemporary user activity data. Task lists, conditional probabilities, confidence scores, task characteristics, and the like may be stored, for example, as task models 227 of FIG. 2.

Task tracker 272 is configured to track tasks with respect to objectives and users. To do so, task tracker 272 may utilize event detector 281, which may detect a task as an event. For a particular user, task tracker 272 may determine which tasks the user has pursed, will pursue, and/or is pursuing, and store this information in task tracking data 252 of the user's user profile. Task tracker 272 can track multiple instances of the same task, and each instance may be stored in association with a time stamp and other task context (e.g., as an event). For each objective, task tracker 272 can maintain a status record of the tasks of the objectives. This can include, for example, which tasks the user has completed, which tasks the user is pursing, and/or which tasks the user will likely pursue. Task tracker 272 may further track multiple instances of the same objective, and may determine which task is associated with which instance. For example, a task on a task list which is completed a long time before another task on the same task list may not be associated with the same instance of an objective. Task tracker 272 can determine and detect whether these tasks are associated with the same instance of the objective.

Objective identifier 274 is configured to associate objectives with users. Whether a user is associated with an objective can be based on, amongst other potential factors, tasks, or events, associated with the user and/or user personal features. For example, objective identifier 274 may associate a user with an objective based determining a task which task tracker 272 has associated with the user is on the task list of the objective. This can be based on the status records of tasks maintained by task tracker 272. In some cases, this includes objective identifier 274 determining a user has, will, or is pursuing a task associated with the objective (e.g., on its task list) using a status record for the objective.

Furthermore, objective identifier 274 may associate a user with an objective based on determining that personal user features of the user determined using personal feature identifier 286 correspond to one or more objective, task, or other characteristics or properties of the objective. As indicated above, the characteristics can be derived from patterns of the user activity data associated with the objective. Properties of an objective may refer more generally to characteristics (e.g., pattern based) or non-pattern based parameters assigned to the objective. As an example, users who travel frequently are more likely to be associated with an objective having a property associated with travel.

Using any combination of the forgoing factors, objective identifier 274 may determine a confidence score which quantifies whether a user is pursing or will pursue a particular objective. This confidence score can increase, for example, based on objective identifier 274 determining more and/or stronger associations between the user and tasks on the task list of the objective and/or properties of the objective. For example, as event detector 281 detects additional tasks on the task list, the confidence score can increase (e.g., as the user performed and/or completes additional tasks). Furthermore, where an objective property corresponds to an out of routine user, objective identifier 274 can increase the confidence score based on out of routine detector 218 determining the user is, was, or will be out of routine. Where a confidence score of an objective is sufficiently high, objective identifier 274 may determine the user is associated with pursing the objective.

It should be appreciated that a user may be associated with pursing any number of objectives at a given time. Further, objective identifier 274 may determine a user is no longer associated with pursuing a particular objective (e.g., instance of the objective) based on determining each task of the task list of the objective has been completed, that the user is no longer pursuing the objectives, and/or that the user has completed the objective. This information can be indicated for an instance of an objective in the status record associated with the instance of the objective.

Approaches have been described above for associating users with objectives. Based on these determinations, content may be generated and/or presented to a user using presentation component 220 in order to assist the user with information relevant to the user's pursuit of the objective. Presentation component 220 may generate content, provide content, and/or refrain from the foregoing with respect to the user based on these determinations. As mentioned above, examples of the content include information identifying the objective and/or one or more tasks of the objective to the user, indications of completed and/or uncompleted tasks of the objective, information determined based on (e.g., inferred from) the one or more tasks and/or objective, and/or information to assist the user in completion of one or more tasks of the objective.

At least some of the content provided to the user may be generated in advance by presentation component 220 for the user based on whether objective identifier 274 has associated the user with an objective. For example, content corresponding to one or more tasks on the task list of an objective may be generated, prepared, or provided (e.g., to one or more user devices associated with the user) in advance of the user pursuing the tasks. Upon detecting some trigger condition associated with a task is satisfied, presentation component 220 may cause the pre-prepared content to be presented to the user. Using this approach, the content can be provided to a user quickly in order to meet potentially time critical content delivery requirements. Furthermore, the preparation of the content can be scheduled by a computing system allowing for more predictable or uniform computational load across the system.

For example, where a task corresponds to a user searching for restaurants on vacation, presentation component 220 may prepare listings of restaurant information in advance of the user arriving at a destination, such that it is immediately available upon arrival. This could be triggered, for example, based on presentation component 220 identifying user activity data corresponding to a preceding task in the task list, such as the user traveling to the airport, or boarding a plane. Thus, it should be appreciated that in some cases, tasks on a task list may have some temporal ordering with one or more other tasks on the list. This ordering may be derived (inferred) based on the time stamps of events used to generate tasks on the task list and used as properties of the objective.

Content presented using presentation component 220 may be presented, for example, on any combination of user devices 102*a* and 102*b* through 102*n*. In this capacity, presentation component 220 may employ any of the various data stored with respect to user profiles 250, as well as other data. Presentation component 220 can determine when and/or how content is presented to a user. Presentation component 220 can further determine what content is provided or displayed to the user. In some embodiments, presentation component 220 comprises one or more applications or services operating on a computing device (such as computing device 600 described in FIG. 6 including a user device, such as a mobile computing device) or in the cloud.

In some embodiments the content comprises one or more suggestions, recommendations, or relevant information based on one or more tasks in a task list of an objective. For example, this content may relate to one or more tasks on the task list for which task tracker 272 determines the user has not yet completed and/or pursued. In implementations where task tracker 272 indicates whether a user has completed and/or pursued one or more particular tasks, computing resources can be preserved as presentation component 220 can refrain from generating and/or providing irrelevant information to the user. Using implementations of the present disclosure, content may be provided to assist a user in a task comprising finding a caterer for a party, and other content related to a task comprising finding a venue for the party may not be provided based on task tracker 272 determining the user has or likely has already performed the task (e.g., using a confidence score determined/inferred for the task). Where presentation component 220 refrains from presenting content to a user, processing, power, and other resources related to the presentation of the content are conserved while enhancing computer-human interaction.

In some implementations, the content presented to a user is determined using one or more content templates, or content cards. A content card can comprise one or more static content fields and/or one or more dynamic content fields. Static content fields correspond to content fields having corresponding content that is displayed each time the content card is presented. Dynamic content fields correspond to content fields having corresponding content that may vary between presentations of the content card.

In some cases, presentation component 220 may select one or more content cards and/or modify one or more dynamic content fields of selected content cards based on one or more tasks in a task list of an objective associated with a user, task properties of the tasks, and/or objective properties of the objective. Corresponding content of one or more dynamic content fields may be modified for presentation, removed from presentation, or otherwise determined. Furthermore, one or more content cards may be modified for presentation, removed from presentation, refrained from or removed from being presented, or otherwise be selected for presentation using these determinations.

In some cases, instances of presentation component 220 or one or more portions thereof are incorporated into one or more services (e.g., applications, processes, programs, threads, etc.), which may be running on a user device, and/or a different system than any combination of the various constituents of objective management system 200. As an example, one or more services may receive any combination of information generated and/or stored by objective management system 200. Examples include one or more confidence scores, contextual information, recommended actions, tracked variable variance scores, tracked variables, personal features, and more. A service could be running on a user device and may receive such information from a server. As another example, the service could be running on a server in a different system than servers providing such information. As a further example, the information could be received from one or more other services running on the same device (e.g., a user device) as the service. For example, one to all of the various components of FIG. 2 could be incorporated into the same device, which in some cases may be beneficial for security, privacy, and/or other reasons.

In some cases, one to all of the information may be pushed to the service from a server, for example, based on a subscription to the information. As another option, one to all of the information could be queried for by the service. As an example, the information could be stored in one or more entries in a database. The service, such as an application, may query that information.

Thus, it will be appreciated that, in some cases, routine manager 290 and/or other constituents of objective management system 200 may be provided to applications or services as a cloud service. In this regard, applications on user devices may optionally incorporate an application programming interface (API) for communicating with the cloud service and for providing at least some functionality of presentation component 220. In this way, a common framework may be provided to applications for tailoring content to users based on divergences from their routines.

In some implementations, the services comprise one or more bots, such as bots 275. A bot may refer to a computer program that executes a specific task according to supplied instructions. In various implementations, task delegator 276 is configured to delegate one or more tasks of a task list of an objective to one or more bots. For example, based on associating an objective with a user, task delegator 276 may be employed to perform one or more actions corresponding to pursuing a task such as determining or acquiring content corresponding to the task. This could include, as examples, booking a hotel for a trip, aggregating and acquiring information describing available venues for an event, and/or other actions corresponding to a task. Task delegator 276 may in some cases provide information to a bot, which the bot uses to perform an action. This information can be based on or correspond to personal features or user context of the user associated with the objective, task properties, and/or objective properties. For example, a bot could submit this information to a service or website, such as by automatically filling in one or more form fields used to generate content.

In some implementations, task delegator 276 is configured to search through bots 275 to determine which one or more particular bots to delegate a task from a task list. The bots may be registered on objective management system 200 and may include metadata, keywords, and/or other descriptive information used by task delegator 276 for the searching. The search could be for a bot capable of generating content corresponding to performance of one or more particular tasks in a task list. The descriptive information could indicate one or more types of content the bot is cable of generating or providing and therefore can be used as search criteria.

In addition or instead, task delegator 276 may generate one or more bots to perform one or more tasks. For example, a bot could be implemented as a script, which is generated, at least partially, from one or more user actions extracted from user activity data. As an example, task delegator 276 may identify user actions corresponding to users visiting one or more particular websites, entering specific types of information into various fields on those websites, submitting the information, and other steps performed by users in association with a task. These user actions may be aggregated from multiple users determined to be pursuing the task and compiled into a script used to perform at least a portion of the task on behalf of a user. A generated bot (e.g., purpose-built) may be registered in storage 225 such that it can be used to perform tasks for multiple users and in multiple instances of objectives and tasks. In some implementations, a bot generates at least some of the content described above with respect to presentation component 220, which is presented to the user.

In various implementations, bots and/or content generated based on tasks can be based on task characteristics. For example, as described above, task determiner 270 can aggregate information from multiple users to rank frequently accessed websites and/or services associated with a task. The content for a task may be generated using one or more of the websites and/or services extracted from the user data. Using this approach, a bot may retrieve quotes from the top five travel insurance websites users had accessed in association with the task, and provide those quotes to a user in association with the task. As another example, a bot could automatically access an API to book a reservation at one of the ten most frequented restaurants by users on vacation in a particular area (e.g., based on personal features of the user such as cuisine preferences).

Figure 3:
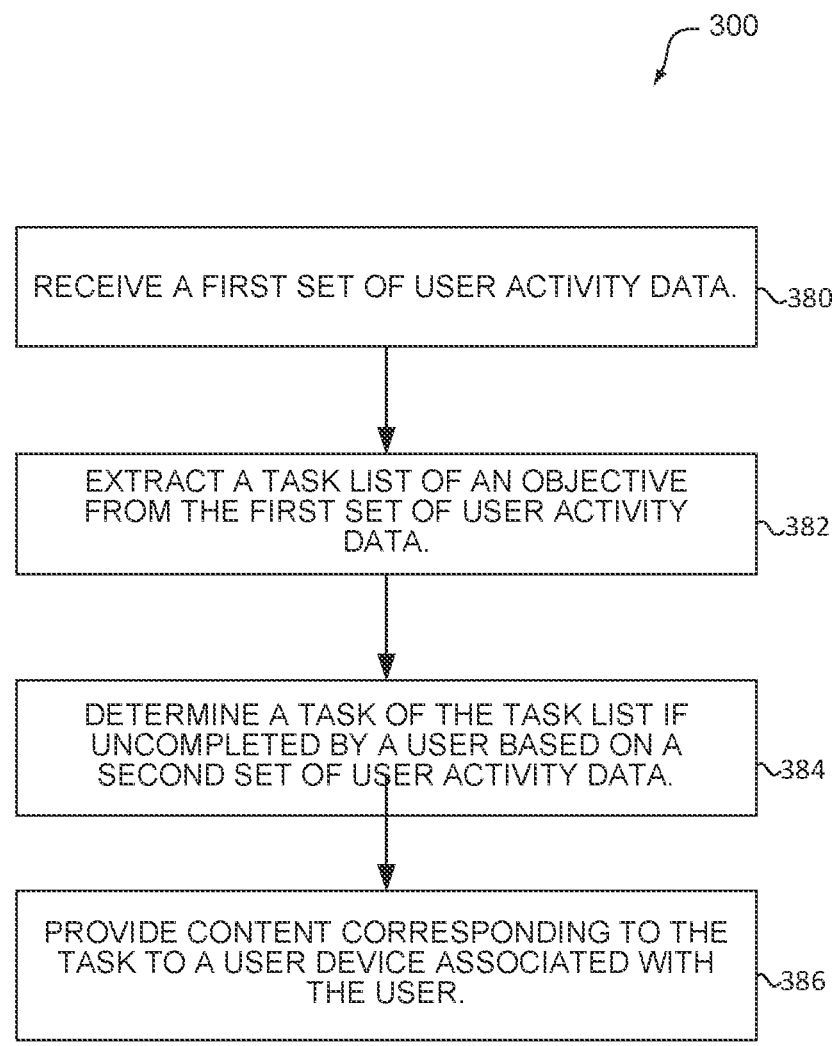
FIG. 3 is a flow diagram showing a method for tailoring content to out of routine events in accordance with implementations of the present disclosure.

Referring now to FIG. 3, FIG. 3 is a flow diagram showing method 300 for assisting users based on objectives in accordance with disclosed embodiments. Each block of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 380, method 300 includes receiving a first set of user activity data. At block 382, method 300 includes extracting a task list of an objective from the first set of user activity data. At block 384, method 300 includes determining a task of the task list is uncompleted by a user based on a second set of user activity data. At block 386, method 300 includes providing content corresponding to the task to a user device associated with the user.

Figure 4:
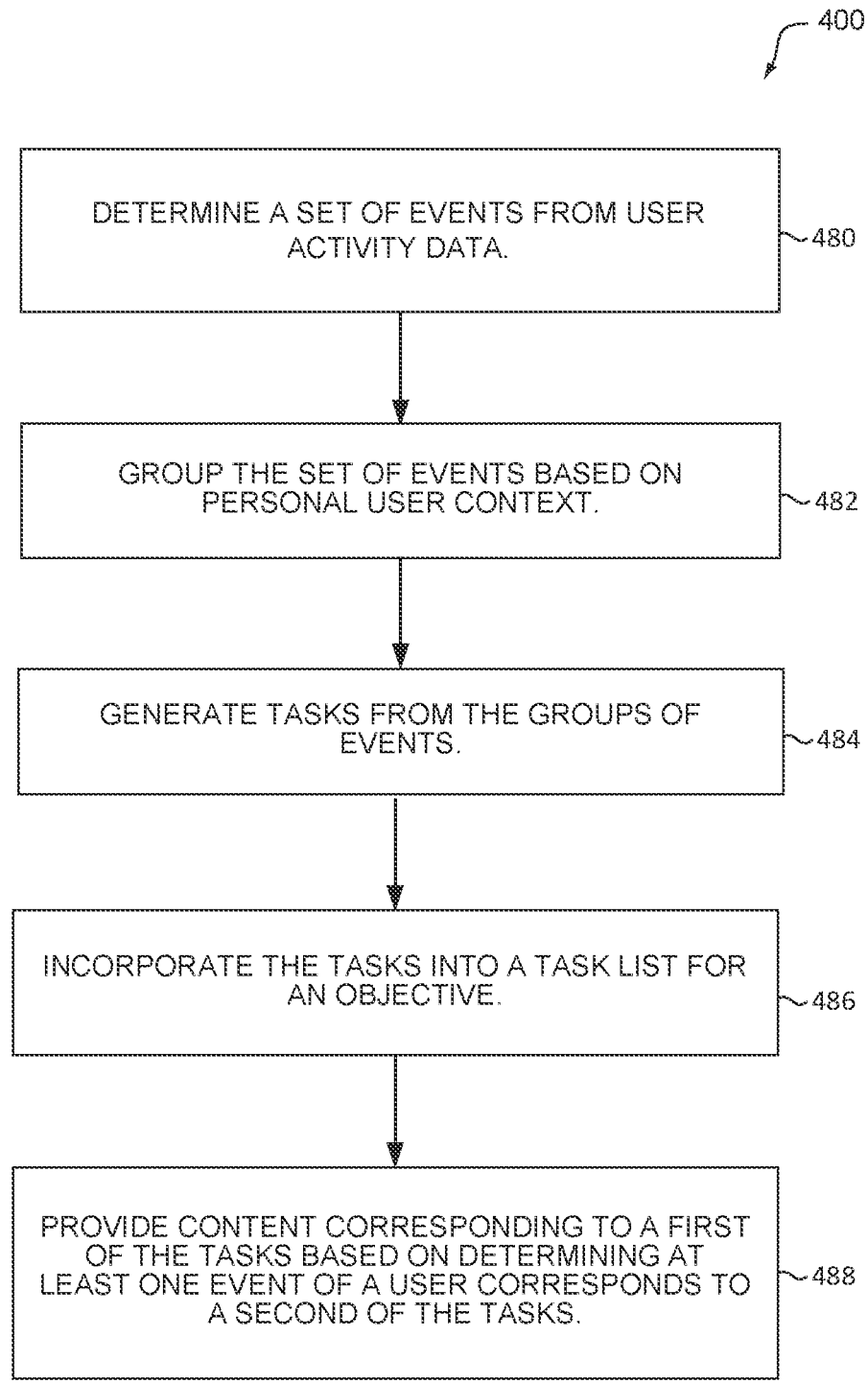
FIG. 4 is a flow diagram showing a method for distinguishing events of users in accordance with implementations of the present disclosure.

Referring now to FIG. 4, FIG. 4 is a flow diagram showing method 400 for assisting users based on objectives in accordance with disclosed embodiments. At block 480, method 400 includes determining a set of events from user activity data. At block 482, method 400 includes grouping the set of events based on personal user context. At block 484, the method includes generating tasks from the groups of events. At block 486, method 400 includes incorporating the tasks into a task list of an objective. At block 488, method 400 includes providing content corresponding to a first of the tasks based on determining at least one event of a user corresponds to a second of the tasks.

Figure 5:
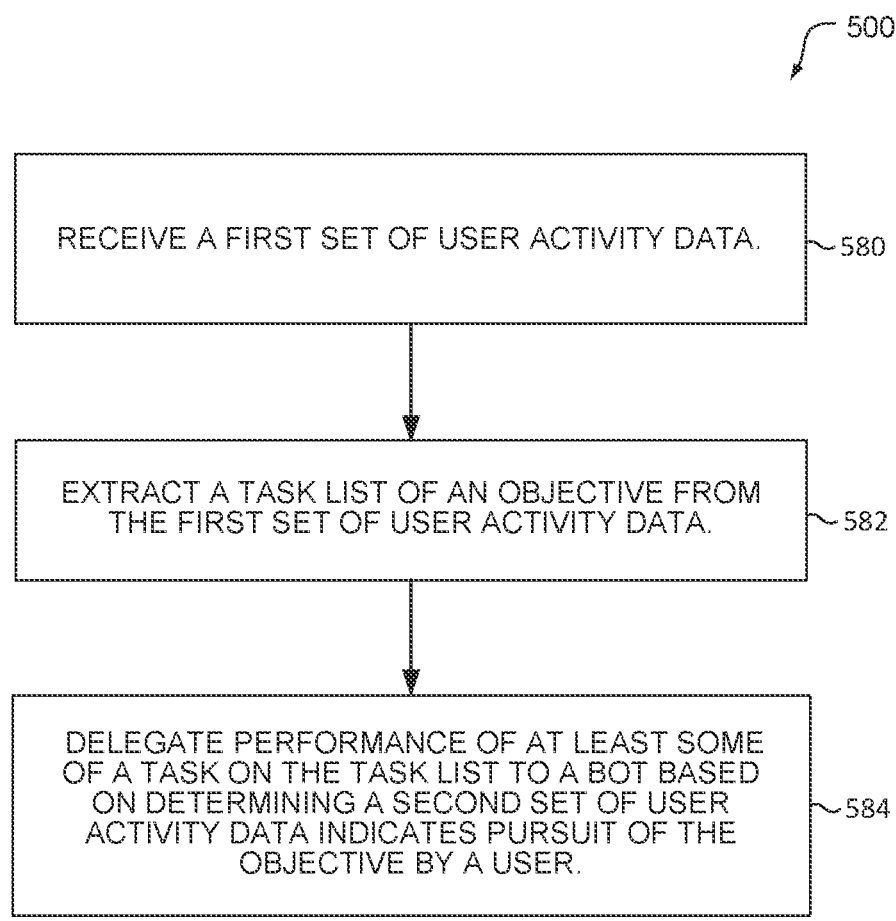
FIG. 5 is a flow diagram showing a method for distinguishing events of users in accordance with implementations of the present disclosure.

Referring now to FIG. 5, FIG. 5 is a flow diagram showing method 500 for assisting users based on objectives in accordance with disclosed embodiments. At block 580, method 500 includes receiving a first set of user activity data. At block 582, method 500 includes extracting a task list of an objective from the first set of user activity data. At block 584, method 500 includes based on determining a second set of user activity data indicates pursuit of the objective by a user, delegating performance of at least some of a task on the task list to a bot.

Figure 6:
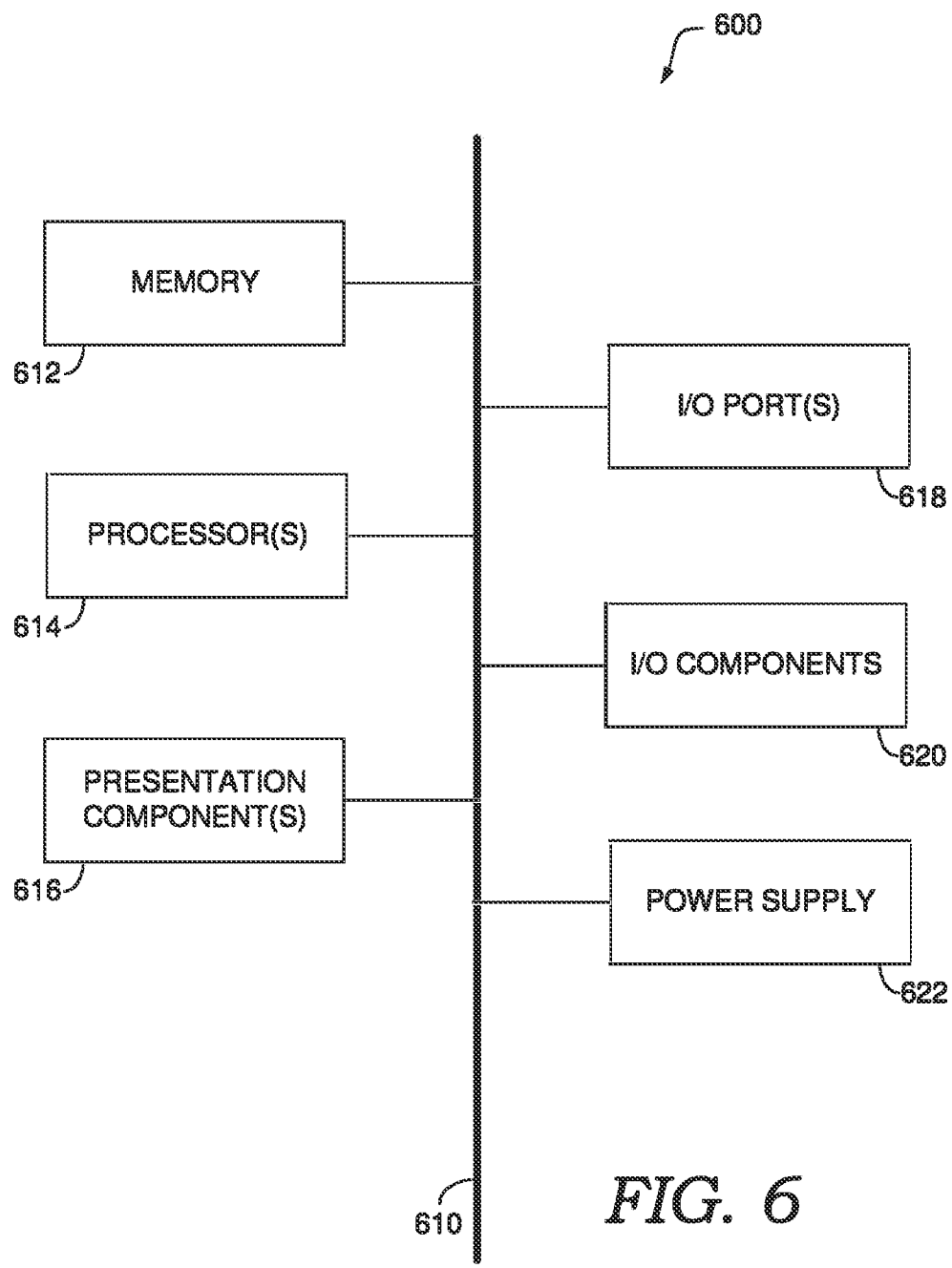
FIG. 6 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, implementations of the present disclosure provide for tailoring content to out of routine events. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computer-implemented system comprising:
one or more processors; and
one or more computer-readable storage media having instructions stored thereon, wherein the instructions, when executed by the one or more processors, cause the one or more processors to perform a method comprising:
receiving a first set of user activity data, the first set of user activity data corresponding to a user pursuing an objective, wherein the first set of user activity data is collected in part based on a first set of sensors;
extracting a task list of the objective from the first set of user activity data based on patterns formed in the first set of user activity data;
receiving a second set of user activity data, wherein the second set of user activity data is collected based in part on a second set of sensors, wherein the first set of user activity data of the user and the second set of user activity data of the user are both associated with pursuit of the objective that includes an uncompleted task based on inferred information; and
based on determining the second set of user activity data indicates pursuit of the objective by the user, delegating performance of the uncompleted task of the task list to a bot via a task delegator that causes the bot to perform the uncompleted task, wherein the bot is configured to:
perform the uncompleted task; and
access an Application Programming Interface (API) to perform one or more actions of the uncompleted task associated with the pursuit of the objective.

2. The computer-implemented system of claim 1, wherein delegating performance of the task to the bot comprises selecting the bot from a plurality of registered bots based on descriptive information of the bot that indicates one or more types of content the bot is capable of providing corresponds to the task.

3. The computer-implemented system of claim 1, wherein delegating performance of the task to the bot comprises providing to the bot information corresponding to at least one personal feature of the user, wherein the bot performs one or more actions based on the information.

4. The computer-implemented system of claim 1, wherein delegating performance of the task to the bot comprises providing to the bot information corresponding to a user context of the user, wherein the bot performs one or more actions based on the information.

5. The computer-implemented system of claim 1, wherein the bot is implemented based on a script comprising one or more user actions extracted from user activity data of the user.

6. The computer-implemented system of claim 1, wherein the bot is configured to access the API to perform the uncompleted task based on aggregated information of a plurality of users performing the task.

7. The computer-implemented system of claim 1, further comprising based on delegating performance of the uncompleted task to the bot, receiving content from the bot, wherein the content is provided to a user device.

8. A computer-implemented method comprising:
receiving a first set of user activity data, the first set of user activity data corresponding to a user pursuing an objective, wherein the first set of user activity data is collected in part based on a first set of sensors;
extracting a task list of the objective from the first set of user activity data based on patterns formed in the first set of user activity data;
receiving a second set of user activity data, wherein the second set of user activity data is collected based in part on a second set of sensors, wherein the first set of user activity data of the user and the second set of user activity data of the user are both associated with pursuit of the objective that includes an uncompleted task based on inferred information; and
based on determining the second set of user activity data indicates pursuit of the objective by the user, delegating performance of the uncompleted task of the task list to a bot via a task delegator that causes the bot to perform the uncompleted task, wherein the bot is configured to:
perform the uncompleted task; and
access an Application Programming Interface (API) to perform one or more actions of the uncompleted task associated with the pursuit of the objective.

9. The computer-implemented method of claim 8, wherein delegating performance of the task to the bot comprises selecting the bot from a plurality of registered bots based on descriptive information of the bot that indicates one or more types of content the bot is capable of providing corresponds to the task.

10. The computer-implemented method of claim 8, wherein delegating performance of the task to the bot comprises providing to the bot information corresponding to at least one personal feature of the user, wherein the bot performs one or more actions based on the information.

11. The computer-implemented method of claim 8, wherein delegating performance of the task to the bot comprises providing to the bot information corresponding to a user context of the user, wherein the bot performs one or more actions based on the information.

12. The computer-implemented method of claim 8, wherein the bot is implemented based on a script comprising one or more user actions extracted from user activity data of the user.

13. The computer-implemented method of claim 10, wherein the bot is configured to access the API to perform the uncompleted task based on aggregated information of a plurality of users performing the task.

14. The computer-implemented method of claim 10, further comprising based on delegating performance of the uncompleted task to the bot, receiving content from the bot, wherein the content is provided to a user device.

15. One or more computer storage media storing computer-useable instructions that, when used by one or more computing devices, cause the one or more computing devices to perform a method comprising:
receiving a first set of user activity data, the first set of user activity data corresponding to a user pursuing an objective, wherein the first set of user activity data is collected in part based on a first set of sensors;

extracting a task list of the objective from the first set of user activity data based on patterns formed in the first set of user activity data;

receiving a second set of user activity data, wherein the second set of user activity data is collected based in part on a second set of sensors, wherein the first set of user activity data of the user and the second set of user activity data of the user are both associated with pursuit of the objective that includes an uncompleted task based on inferred information; and based on determining the second set of user activity data indicates pursuit of the objective by the user, delegating performance of the uncompleted task of the task list to a bot via a task delegator that causes the bot to perform the uncompleted task, wherein the bot is configured to:

perform the uncompleted task; and access an Application Programming Interface (API) to perform one or more actions of the uncompleted task associated with the pursuit of the objective.

16. The one or more computer storage media of claim 15, wherein delegating performance of the task to the bot comprises selecting the bot from a plurality of registered bots based on descriptive information of the bot that indicates one or more types of content the bot is capable of providing corresponds to the task.

17. The one or more computer storage media of claim 15, wherein delegating performance of the task to the bot comprises providing to the bot information corresponding to at least one personal feature or a user a user context of the user, wherein the bot performs one or more actions based on the information.

18. The one or more computer storage media of claim 15, wherein the bot is configured to access the API to perform the uncompleted task based on aggregated information of a plurality of users performing the task.

19. The one or more computer storage media of claim 15, wherein the bot is configured to access the API to perform the uncompleted task based on aggregated information of a plurality of users performing the task.

20. The one or more computer storage media of claim 15, further comprising based on delegating performance of the uncompleted task to the bot, receiving content from the bot, wherein the content is provided to a user device.

* * * * *